United States Patent [19]

Atmur et al.

[11] Patent Number: 5,816,211
[45] Date of Patent: *Oct. 6, 1998

[54] FIBER REINFORCED CERAMIC MATRIX COMPOSITE PISTON AND CYLINDER/ SLEEVE FOR AN INTERNAL COMBUSTION ENGINE

[75] Inventors: Steven Donald Atmur, Riverside; Thomas Edward Strasser, Corona, both of Calif.

[73] Assignee: Northrop Grumman Corporation, Los Angeles, Calif.

[*] Notice: The term of this patent shall not extend beyond the expiration date of Pat. No. 5,740,788.

[21] Appl. No.: 822,263

[22] Filed: Mar. 20, 1997

Related U.S. Application Data

[62] Division of Ser. No. 515,927, Aug. 16, 1995.

[51] Int. Cl.[6] .................................................... F02B 75/08
[52] U.S. Cl. ............................ 123/193.4; 123/193.6; 123/668
[58] Field of Search .......................... 123/193.4, 193.6, 123/193.1, 668; 92/223; 428/224

[56] References Cited

U.S. PATENT DOCUMENTS

| | | | |
|---|---|---|---|
| 4,618,529 | 10/1986 | Yamamura et al. | 428/224 |
| 4,846,051 | 7/1989 | Wade et al. | 123/193.6 |
| 4,864,987 | 9/1989 | Kawamura | 123/668 |
| 5,063,881 | 11/1991 | Kawamura | 123/668 |
| 5,408,964 | 4/1995 | Rao | 123/668 |
| 5,469,777 | 11/1995 | Rao | 92/223 |

*Primary Examiner*—Marguerite McMahon
*Attorney, Agent, or Firm*—Terry J. Anderson; Karl J. Hoch, Jr.

[57] ABSTRACT

This invention discloses a "ceramic" piston and cylinder/sleeve pair for an internal combustion engine. The pair has low coefficients of thermal expansion for closer parts tolerances without danger of seizing and/or breakage/cracking from dissimilar part expansions. A piston is formed of a structural fiber reinforced ceramic matrix composite material and then a combined first erosion-resistant and self-lubricating material is applied to a surface of a skirt portion of the piston. A cylinder/sleeve is formed of a structural fiber reinforced ceramic matrix composite material and then a second combined erosion-resistant and self-lubricating material is applied to the surface of the cylinder/sleeve.

17 Claims, 1 Drawing Sheet

FIBER REINFORCED CERAMIC MATRIX COMPOSITE PISTON AND CYLINDER/SLEEVE FOR AN INTERNAL COMBUSTION ENGINE

"This is a division of application Ser, No. 08/515,927, filed Aug. 16, 1995."

BACKGROUND OF THE INVENTION

1. Field of the Invention

This invention relates to components of internal combustion engines and, more particularly, to a ceramic piston and cylinder/sleeve pair for an internal combustion engine made by the steps of, forming a piston of a structural fiber reinforced ceramic matrix composite material; applying a first erosion-resistant material on the skirt portion of the piston; forming a cylinder/sleeve of a structural fiber reinforced ceramic matrix composite material; and, applying a second erosion-resistant material on a cylinder wall, internal surface of the cylinder/sleeve.

2. Background Art

In a classical prior art internal combustion engine 10 as depicted in a simplified drawing of FIG. 1, the cylinders 12 and pistons 14 are of metal. Early engines were of cast iron while later engines are of lighter metals and alloys of, for example, aluminum. The use of a cylindrical sleeve insert 16 for the walls of the cylinders became common in aluminum engine blocks and diesel engine blocks. In traditional cast iron engine blocks, once wear occurred within the engine, the cylinders had to be bored and honed and then oversized pistons and rings used in the rebuilt engine. With the inserts, to rebuild an engine, if ever necessary, the sleeve inserts 16 need only be replaced. Regardless of the materials used for the cylinder walls, the standard method of sealing the space between the cylinder walls and the piston is the piston ring. A space exists (and must exist) because of dissimilar thermal expansion of the piston and cylinder sleeve. If the piston and cylinder were sized exactly with only enough clearance for the piston to fit within the cylinder with a thin coating of lubricating oil film between them, as soon as the metal heated from the combustion within the cylinders and expanded, the piston would seize within the cylinder. If enough clearance were provided initially to allow for expansion, the blow-by would be so extreme that the engine would not run sufficiently to get up to temperature and create the proper seal. Thus, the expansion space is provided and the clearance gap is closed with piston rings. Each piston ring is disposed in a ring groove in the peripheral surface of the piston adjacent the top thereof. Note also that the piston rings ride within the cylinder 12 or sleeve insert 16 on a film of oil. If the oil is removed, the piston 14 will seize. While engine designs and materials have certainly improved over the years, there still remain deficiencies such as lower than desirable fuel efficiency and higher than desirable pollution emissions. In a co-pending application entitled HIGH-EFFICIENCY, LOW-POLLUTON ENGINE by the inventors herein Ser. No. 08/515,649, filed on even date herewith and assigned to the common assignee of this application, a new engine design also employing an improved structural fiber reinforced ceramic matrix composite (FRCMC) material is disclosed for a high temperature internal combustion engine. Being of the FRCMC, the pistons and cylinders can withstand much higher operating temperatures than convention internal combustion engines. The higher temperatures provide for more complete burning of the fuel which, in turn, leads to greater fuel efficiency and lower unburned pollutants being produced. Moreover, since the coefficient of thermal expansion of the parts is much lower than metals, much closer tolerances can be maintained without the danger of engine seizure, further adding to the foregoing benefits.

If the coefficient of thermal expansion of pistons and cylinders could be reduced to a minimum and/or tailored to result in virtually identical thermal expansion of the piston and cylinder bore (at peak and typical operating temperatures), the tolerances could be maintained even closer for added benefits without increasing the danger of seizing, breaking, and/or cracking.

The coated structural FRCMC material employed in the engine is harder than steel, while being lighter than aluminum. The FRCMC materials can be operated as a piston or sleeve material at bulk material temperatures in excess of 1200° F. This enhanced temperature capability combined with fatigue and creep resistance superior to steel pistons (at these same temperatures) will result in increased durability and performance. Additionally, being a ceramic, it is not prone to the oxidation problems of metal.

Wherefore, it is an object of this invention to provide pistons and cylinders/sleeves for an internal combustion engine which are of maximum strength and durability and minimum weight for their size.

It is another object of this invention to provide pistons and cylinders/sleeves for an internal combustion engine which are able to operate with reduced oil lubrication without damage.

It is still another object of this invention to provide pistons and cylinders/sleeves for an internal combustion engine which are of materials which are non-eroding and self-lubricating to the degree necessary when in sliding contact with one another.

It is yet another object of this invention to provide pistons and cylinders/sleeves for an internal combustion engine which have low and tailorable coefficients of thermal expansion.

Other objects and benefits of this invention will become apparent from the description which follows hereinafter when read in conjunction with the drawing figures which accompany it.

SUMMARY OF THE DISCLOSURE

The foregoing objects have been achieved by the ceramic piston and cylinder/sleeve pair for an internal combustion engine of the present invention comprising, a piston formed of a structural fiber reinforced ceramic matrix composite material; a first erosion-resistant material disposed on the skirt portion of the piston; a cylinder/sleeve formed of a structural fiber reinforced ceramic matrix composite material; and, a second erosion-resistant material disposed on a cylinder wall, internal surface of the cylinder/sleeve, the second erosion-resistant material also exhibits self-lubricating nature when in contact with the first erosion coating.

The preferred structural fiber reinforced ceramic matrix composite material comprises fibers of a generic fiber system disposed in polymer-derived ceramic resin in its ceramic state.

Additionally for light-weight coupled with strength, the fibers are tightly compressed within the polymer-derived ceramic resin to create between a 30% and 60% fiber volume.

Preferably, the first erosion-resistant material is comprised of mulite, or alumina, with $TiO_2$ and a metallic element, such as, but not limited to gold, silver, molybdenum or copper. Additionally, Tungsten carbide and alloys thereof have been demonstrated as suitable piston ring coatings.

Also preferably, the second erosion-resistant material comprises a mixture of Alumina, $TiO_2$, Yitria, and a metallic element such as, but limited to, gold, silver, molybdenum or copper.

DETAILED DESCRIPTION OF THE PREFERRED EMBODIMENT

In the above-referenced co-pending application entitled HIGH-EFFICIENCY, LOW-POLLUTION ENGINE, an improved structural FRCMC material is disclosed having high breakage resistance and particular applicability to use for parts in a high temperature internal combustion engine. The pistons and cylinders/sleeves of the present invention attain their objectives by use of that same material in a particular manner and with additional additives.

Figure 2:
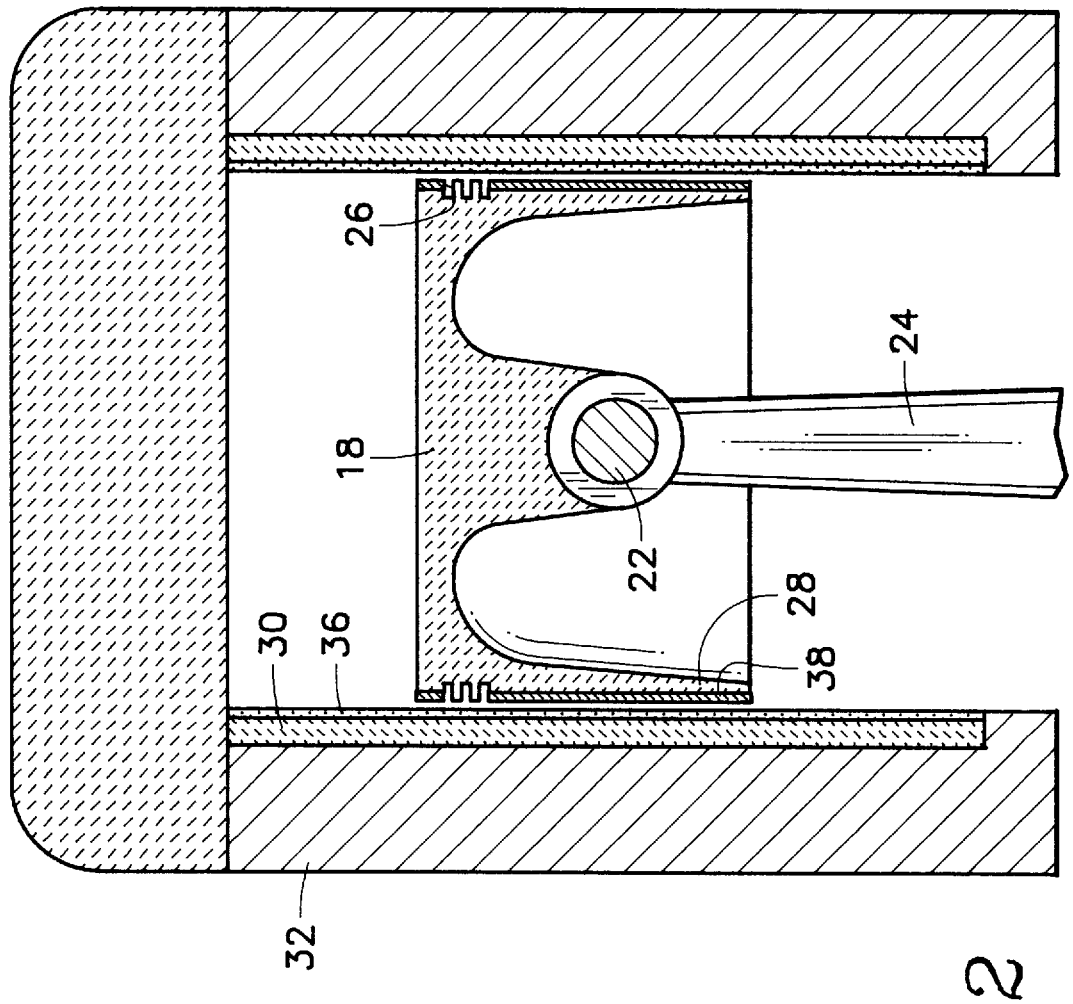
FIG. 2 is an enlarged, simplified, partially cutaway drawing of a cylinder and piston of an internal combustion engine according to the present invention.
Figure 1:
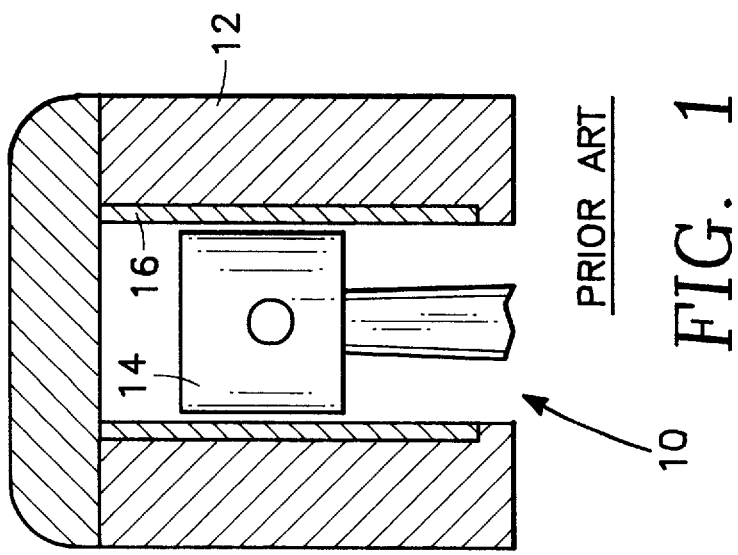
FIG. 1 is a simplified, partially cutaway drawing of a prior art cylinder and piston of an internal combustion engine.

The elements of the present invention are depicted in FIG. 2. There is an all "ceramic" piston 18 which has the wrist-pin 22 connected to the connecting rod 24. The piston 18 includes ring grooves 26 and a "skirt" 28. The FRCMC material is used where wear and thermal resistance are a problem or where enhanced thermal resistance and wear are desired to achieve increased performance or reduced emissions, and metal is used where application requirements demand strength with no high temperature or elevated heat load requirements (piston rods for example). Thus, there is a FRCMC cylinder/sleeve 30 carried by a metal engine "block" 32. The designation "cylinder/sleeve" is employed rather than "cylinder" or "sleeve" since a cylinder is typically part of the engine block itself and a sleeve is a thin cylindrical liner disposed as the sidewalls of a cylindrical cylinder. In this case, in one engine design employing the present invention, the FRCMC cylinder/sleeve 30 may be a thin sleeve within a cylinder of the block 32 inserted strictly for insulation and wear resistance, while in another it may be thick enough to comprise a structural, load carrier integral component of the surrounding engine block, not merely supported and carried by the surrounding block 32.

Both the piston 18 and the cylinder/sleeve 30 are made of structural fiber reinforced ceramic matrix composite material comprising a polymer-derived ceramic resin having fibers of a generic fiber system disposed throughout. The preferred FRCMC material of this invention employs any of several polymer-derived ceramic resins commercially available such as Silicon-Carboxyl resin (sold by Allied-Signal under the trade name Blackglas), Alumina-Silicate resin (sold by Applied Poleramics under the product designation CO2) or Monoaluminum Phosphate (also known as Monoalumino Phosphate) resin. Combined with a generic fiber system such as, but are not limited to, Alumina, ALTEX, Nextel 312, Nextel 440, Nextel 510, Nextel 550, Silicon Nitride, Silicon Carbide, HPZ, Graphite, Carbon, and Peat. Note that Monoaluminum Phosphate resin is not a true polymer derived ceramic resin. Monoaluminum Phosphate resin is a cementatous resin that has been modified to emulate the processing methods of typical structural polymer composite systems. Hereinafter, the term polymer-derived ceramic resin or matrix is defined to include both true pre-ceramic polymer systems and cementatous systems that have been modified to emulate the processing methods of typical structural polymer composite systems.

To add additional toughness qualities to the material, the fiber system can first be coated to a few microns thickness with an interface material such as Carbon, Silicon Nitride, Silicon Carbide, Silicon Carboxide, Boron Nitride or multiple layers of one or more of these interfacial materials. The interface materials prevents the resin from strongly adhering directly to the fibers of the fiber system. Thus, when the resin has become a ceramic, there is a slight play between the ceramic matrix and fibers imparting the desired qualities to the final FRCMC.

Since the piston 18 takes the force of combustion and transmits that force to the crankshaft through the connecting rod 24, it can be subjected to more forces tending to break it than many other parts internal to the engine. Since inertia is a factor in engine life, wear, and fuel efficiency, having the lightest piston possible with the maximum strength is desirable. It is also desirable for overall vehicle fuel efficiency to have the engine (and therefore the cylinder/sleeve 30) be as strong and lightweight as possible. This can be addressed for purposes of the present invention in several ways. The first is the manner of constructing the piston 18 and cylinder/sleeve 30.

A FRCMC behaves substantially like any other composite material such as so-called "fiberglass". That is, the manner in which it is constructed has a direct bearing on the ultimate weight and strength of the part. For example, fiberglass comprises glass fibers disposed throughout a hardened resin material such as epoxy. The higher the resin-to-fiber ratio in the end product, the heavier the product is and the more breakage prone the product is. By using only enough resin to bond tightly packed fibers together, the resultant product is light weight, strong, and tough. A fiberglass fishing pole is a good example. The length and orientation of the fibers themselves also contribute to the qualities of the product. To add bulk and overall strength to a fiberglass shell (as in a hot tub or the like) a so-called "chop gun" is used to blow a mixture of short, random oriented glass fibers onto a surface. By contrast, to make a strong, lightweight, flexible boat hull, woven glass fiber cloth matting is layed-up in a mold and the resin is rolled and pressed into the fibers making a dense composite. Even stronger and more lightweight materials can be made by laying up the fiberglass materials and subjecting them to a squeezing pressure so as to tightly compact them prior to the setting up of the resin.

In the preferred construction of the parts addressed by the present invention, the resin/fiber mixture is formed by a combination of heat and pressure by methods well-known by those experienced in the art of manufacturing military aircraft structural composites. The formed pre-ceramic composites are then subjected to a high temperature firing cycle (per material supplier specifications) to convert the pre-ceramic composite shape into a ceramic matrix composite structural part.

Having thus addressed the aspect of making the parts lightweight and strong, the issue of self-lubrication/erosion-resistance will now be addressed. The contacting surfaces of the cylinder/sleeve 30 and the piston skirt 28 are treated differently. In a co-pending application entitled REDUCING WEAR BETWEEN STRUCTURAL FIBER REINFORCED CERAMIC MATRIX COMPOSITE AUTOMOTIVE ENGINE PARTS IN SLIDING CONTACTING RELATIONSHIP by the inventors herein Ser. No. 08/515,926, filed on even date herewith and assigned to the common assignee of this application, the teachings of which are incorporated herein by reference, the use of an erosion-resistant material on the surface of the structural FRCMC is disclosed. Specifically, the application of Alumina ($Al_2O_3$) or Mulite (Alumina Silicate, ($Al_3Sl_4$) or Tungsten Carbine (WC) by plasma spraying is suggested. To meet the specific needs of the piston and by cylinder/sleeve, however, certain additional considerations must be made for preferred performance.

The preferred erosion-resistant material 36 for the wear surface of the cylinder/sleeve 30 is a coating mixture of Alumina, between 2% and 29% $TiO_2$, between 0% and 1% Yitria and between 2% and 15% of molybdenum. The mixture is a powder which is plasma sprayed in the conventional manner as that known to those skilled in the art of plasma spraying. The mixture provides both erosion-resistance and self-lubricating qualities to the surface. As the sidewall is that against which the piston ring is going to slide, Mulite (in place of the alumina) is optional but not preferred because it is softer than the above mixture.

The preferred erosion-resistant material 38 for the skirt of the piston 28 is a mixture of Alumina or Mulite and $TiO_2$ (between 2–15%) and molybdenum (between 2–15%). The skirt coating is designed to be softer than the sleeve coating.

Wherefore, having thus described the present invention, What is claimed is:

1. An internal combustion subassembly for an internal combustion engine having low coefficients of thermal expansion, said subassembly comprising:
    a) a piston formed of a first structural fiber reinforced ceramic matrix composite material and having a side skirt portion and a top portion;
    b) a first erosion-resistant material disposed on the skirt portion of said piston, said first erosion-resistant material also possessing self-lubricating characteristics;
    c) a cylinder formed of a second structural fiber reinforced ceramic matrix composite material and having an interior cylinder wall; and,
    d) a second erosion-resistant material disposed on said cylinder wall surface of said cylinder, said second erosion-resistant material possessing self-lubricating characteristics and being harder than said first erosion-resistant material, wherein said piston being disposed within said cylinder so that said skirt is adjacent said cylinder wall.

2. The subassembly of claim 1, wherein:
said first and second structural fiber reinforced ceramic matrix composite materials comprise reinforcing fibers disposed in a pre-ceramic polymer resin in a ceramic state.

3. The subassembly of claim 2 wherein:
said fibers are tightly compressed within said pre-ceramic polymer ceramic resin.

4. The subassembly of claim 1 wherein:
said first erosion-resistant material is made of alumina.

5. The subassembly of claim 1 wherein:
said alumina consists of $TiO_2$ between 2–15% and molybdenum between 2–15%.

6. The subassembly of claim 1 wherein:
said first erosion-resistant material is made of mulite.

7. The subassembly of claim 1 wherein:
said second erosion-resistant material is made of alumina.

8. The subassembly of claim 1 wherein:
said second erosion-resistant material is made of alumina consisting between 2% and 29% of $TiO_2$, between 0% and 1% of yitria, and between 2% and 15% molybdenum.

9. The subassembly of claim 1 wherein:
said second erosion-resistant material is made of tungsten carbine.

10. The subassembly of claim 1, wherein:
said first and second structural fiber reinforced ceramic matrix composite materials are made of the same material.

11. The subassembly of claim 1 wherein:
said first erosion-resistant material is made of mulite with $TiO_2$ and a metallic element.

12. The subassembly of claim 1 wherein:
said metallic element consists of at least one of gold, silver, molybdenum, and copper.

13. A method of making an internal combustion subassembly having low coefficients of thermal expansion for use in an internal combustion engine comprising the steps of:
    a) forming a piston of a first structural fiber reinforced ceramic matrix composite material;
    b) applying a first erosion-resistant and self-lubricating material on a skirt portion of the piston;
    c) forming a sleeve of a second structural fiber reinforced ceramic matrix composite material and adapted for receiving said first piston; and,
    d) applying a second erosion-resistant and self-lubricating material which is harder than said first erosion-resistant and self-lubricating material on an interior cylinder wall surface of the sleeve adjacent said skirt portion.

14. The method of claim 13 wherein said step of forming a piston of a structural fiber reinforced ceramic matrix composite material comprises the steps of:
    a) disposing reinforcing fibers in the shape of a piston;
    b) impregnating the fibers within a pre-ceramic polymer resin;
    c) compressing the resin-impregnated fibers together; and,
    d) firing the compressed and resin-impregnated fibers for a time and at a temperature sufficient to convert the resin into a ceramic.

15. The method of claim 13 wherein said step of forming a sleeve of a second structural fiber reinforced ceramic matrix composite material comprises the steps of:
    a) disposing reinforcing fibers in the shape of a cylinder sleeve;
    b) impregnating the fibers with a pre-ceramic polymer resin;
    c) compressing the fibers together; and,
    d) firing the compressed and resin-impregnated fibers for a time and at a temperature sufficient to convert the resin into a ceramic.

16. The method of claim 13 wherein said step of applying a first erosion-resistant and self-lubricating material on a skirt portion of the piston comprises:
    plasma spraying the skirt portion of the piston with a mixture consisting between 2% and 15% of $TiO_2$ and between 2% and 15% of molybdenum.

17. The method of claim 13 wherein said step of applying a second erosion-resistant and self-lubricating material on the interior cylinder wall surface of the sleeve comprises:
    plasma spraying the wall surface of the sleeve with a mixture consisting between 2% and 29% of $TiO_2$, between 0% and 1% of yitria and between 2% and 15% of molybdenum.

* * * * *